Aug. 22, 1933.                W. G. STONER                1,923,462
METHOD AND APPARATUS FOR LINING BRAKE SHOES
Original Filed Feb. 15, 1929
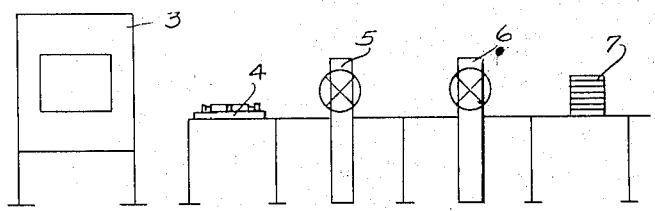
FIG.-1
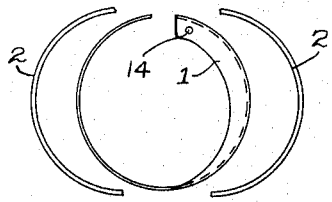
FIG.-2
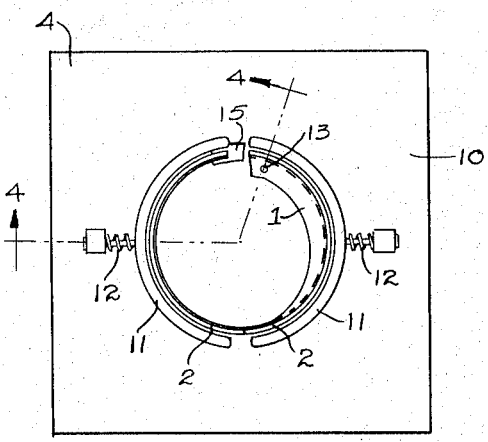
FIG.-3
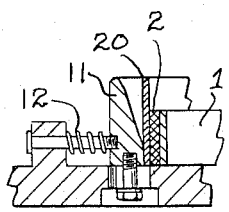
FIG.-4
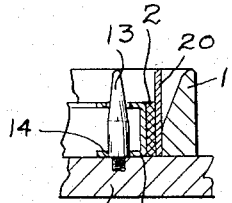
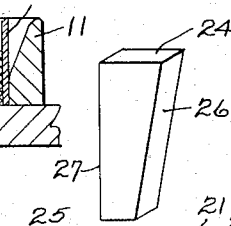
FIG.-6
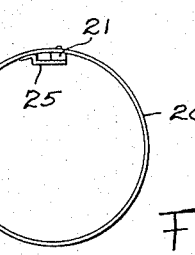
FIG.-5
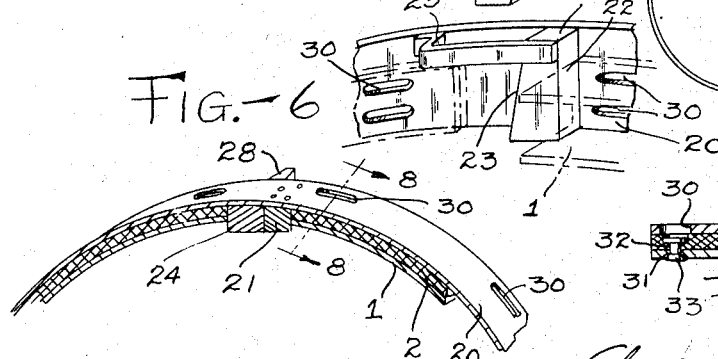
FIG.-7     FIG.-8
Willie Gordon Stoner Inventor
By Bates Goldrick & Teare
Attorneys Patented Aug. 22, 1933

1,923,462

UNITED STATES PATENT OFFICE 1,923,462

METHOD AND APPARATUS FOR LINING BRAKE SHOES

Willis Gordon Stoner, Detroit, Mich., assignor to The Midland Steel Products Company, Cleveland, Ohio, a Corporation of Ohio, as trustee for Steeldraulic Brake Corporation, Detroit, Mich., a Corporation of Michigan Application February 15, 1929, Serial No. 340,249
Renewed June 17, 1933

9 Claims. (Cl. 29—84)

This invention relates to brakes and has to do with lining brake shoes and is more particularly concerned with a method of conforming and securing a relatively rigid lining to a brake shoe and to apparatus by means of which the method is carried out.

It is among the objects of my invention to secure a lining to a brake shoe in a manner whereby the lining will be firmly held and will have a uniform close contact with all of the lining supporting part of the shoe. A more specific object is to treat a relatively hard molded lining in such a manner that it will be pliable during the time when it is attached to the shoe so that it may be forced into intimate uniform contact with the lining supporting part of the shoe. Another object is to provide means with which a substantially uniform pressure is maintained between the lining and the shoe while the lining is being permanently secured to the shoe. Another object is to provide simple and effective means for securing the lining to the lining supporting part of a substantially annular internal expanding brake shoe.

Other objects will appear from the following description of a preferred form of my invention, reference being had to the accompanying drawing. The essential characteristics are summarized in the claims.

In the drawing, Fig. 1 illustrates diagrammatically an arrangement of devices through which the parts pass in carrying out the steps of the method described herein; Fig. 2 illustrates a brake shoe of the band type along with separate pieces of pre-formed molded lining to be secured thereto; Fig. 3 is a top plan view of part of a fixture used in securing the lining showing the shoe and lining lying therein; Fig. 4 is a broken section taken along the broken line 4—4 of Fig. 3 with the addition of a band not shown in Fig. 3; Fig. 5 illustrates a band within which the shoe and lining is expanded prior to the operation of securing the lining to the shoe; Fig. 6 is a perspective of part of the band illustrated in Fig. 5 showing the expanding parts; Fig. 7 is a broken radial section through the ends of the shoe, the lining and the encircling band with the wedging device; and Fig. 8 is a section taken along the line 8—8 of Fig. 7.

Referring to the drawing, particularly Fig. 2, I illustrate the brake shoe 1 to which I desire to secure two substantially semi-cylindrical pieces of brake lining 2. The brake lining 2 is molded and pressed to shape and at normal temperatures is no more pliable than wood. Such a lining has been found to be highly advantageous in use because of its great life and resistance to moisture, but it has been found difficult to satisfactorily secure this lining to the shoe because of its stiffness. Heretofore such linings have been attached in the usual manner with the result that the lining did not have a uniform and intimate contact with the lining supporting surface of the shoe, and under such circumstances various unsatisfactory results were obtained. For instance, when a zone of the lining is out of contact with the shoe, then that portion of the lining not contacting with the shoe will be higher than the adjacent zones of the lining and will take an excessive duty which will tend to cause squeals and will certainly tend to put an excessive load on the adjacent rivets.

One of the features of my invention consists in heating the lining to a temperature at which it becomes relatively pliable and conforming and securing the lining to the shoe while in the pliable state. A moderately rapid heating to about 300° F. has been found satisfactory. While the lining is at this temperature, it is forced into intimate contact with all of the lining supporting surface of the shoe by apparatus presently to be described, and while held in such contact, is drilled and riveted to the shoe, after which it is permitted to cool and is thereafter ready for a long continued arduous service.

Referring to Fig. 1, I illustrate diagrammatically an oven 3 in which the pieces of lining are warmed to the temperature at which they become pliable. The pieces of lining are taken from the oven and with the aid of a fixture 4 are snugly fitted and temporarily squeezed onto the shoes. While the shoes and lining are so held, they are passed through a drilling and reaming machine 5 and then through a riveting machine 6 in which the linings are permanently secured to the shoes. Thereafter the temporary securing means are removed from the shoes and linings and the shoes may be stacked in a pile as at 7, awaiting other operations of assembly.

The apparatus by means of which the linings are formed and temporarily secured to the shoes comprises the fixture 4 having a bed plate 10 (see Figs. 3 and 4) on which are slidably mounted arcuate guides 11 having inwardly inclined sides. These guides have a limited lateral travel and are urged inwardly by light coil springs 12. Secured to the bed plate is an upstanding pin 13 which is tapered at its upper end and serves as a guide for centering the brake shoe. Referring back to Fig. 4 it will be noted that the particular brake shoe illustrated has axial apertures 14, which when the shoe is placed in the fixture, receive the pin 13.

To secure the pieces of lining to the shoe, the shoe is first laid on the bed plate between the guides 11, as illustrated in Fig. 3. Thereafter the pieces of lining 2 are forced between the guides 11 and the outer periphery of the shoe (see also Fig. 4) so that the shoe and the lining lie in relatively loose contact and in lateral alignment in about the position to which they are to be ultimately secured. While the shoe and the pieces of lining lie in this position, an annular band 20, (see Fig. 5), of relatively light and flexible stock having an internal diameter slightly greater than the normal exterior diameter of the shoe and lining, is dropped or forced downwardly between the guides 11 and the pieces of lining 2, as shown in Fig. 4. Thereafter by means of a simple wedging device, part of which is incorporated with the band 20, the shoe is expanded into the band with considerable pressure so that the then heated and pliable pieces of lining are squeezed between the band and lining supporting part of the shoe and are made to conform to the lining supporting surface of the shoe.

The wedging device consists of a block 21 (see Figs. 5, 6, and 7) which is secured to the inner face of the band and which presents a radial surface 22 to one end of the shoe, and which presents an inclined surface 23 against which a separate wedge member 24 may be driven. A bracket 25 is also secured to the block 21 and to the inner face of the band and serves to guide the wedge 24 in its entry between the block and the other end of the shoe.

The wedge 24 has an inclined face 26 which contacts with the inclined face 23 of the block 21 and has a radial face 27 which engages the other end of the shoe. Thus as the wedge member is driven downwardly, the faces 22 of the block and 27 of the wedge are forced circumferentially apart and force the ends of the shoe apart to expand the shoe into the band 20. A hole 15 is provided in the bed-plate 10 so that the lower end of the wedge may extend below and beyond the surface of the plate as the shoe ends are spread apart. Thus the end of the wedge protrudes below or beyond the edge of the band, as at 28 (see Fig. 7).

As indicated in Fig. 7, after the wedge has been driven home, the lining is squeezed between the shoe and the band and by reason of the flexibility of the band and the pliability of the lining in its warm condition, a uniform intimate contact is obtained between the lining and the lining engaging surface of the shoe. While the shoe is held expanded within the band by the wedge device, the band is lifted from the fixture 4, carrying the shoe and lining with it. It will be noted in Figs. 6 and 7 that the band is provided with large openings 30 and it should be stated that the shoe may have been previously drilled and punched as at 31, (see Fig. 8) with appropriate rivet holes which lie adjacent these openings.

The band with the shoe and the pieces of lining is then handled as a unit and passed to a drilling and reaming machine which drills the lining with a suitable countersunk hole as at 32. Thereafter and while the parts are still securely held within the band, the lining is secured to the shoe by such means as rivets 33. After the lining has been riveted to the shoe, the wedge 24 is driven from its position between the ends of the shoe by striking the exposed small end 28. In practice this may be simply accomplished by slamming the assembled parts onto a flat table so that the end 28 of the wedge strikes the table and is dislodged from its effective position. Thereafter the band may be lifted from the shoe and the band and wedge are returned to the fixture 4 where they are again used in the same manner.

It will appear from the foregoing that the process and apparatus described herein are eminently simple and highly effective; that by following my teaching one is enabled to firmly secure the hard molded lining to the lining supporting surface of a shoe in such a manner that there will be complete and intimate contact between the lining and the shoe; that with the aid of my apparatus the parts may be accurately and rapidly assembled. While I have illustrated and described a preferred form of my invention, I do not care to be limited in the scope of my patent in that or any manner other than by the claims appended hereto.

I claim:—

1. The method of lining brake shoes which consists in warming the lining to the state of pliability, placing the lining between the exterior of the shoe and the interior of an annular encompassing part, expanding the shoe and squeezing the then warm and pliable lining between the shoe and said part thereby forming the lining to the exact contour of the shoe.

2. The method of lining brake shoes which consists in warming the lining to the state of pliability, placing the lining between the exterior of the shoe and the interior of an annular encompassing part, expanding the shoe and squeezing the lining between the shoe and said part, and thereafter securing the lining to the shoe while held between the shoe and said part.

3. The method of lining brake shoes which consists in placing the lining between the shoe and an annular encompassing part, expanding the shoe and squeezing the lining between it and the said part, thereafter securing the lining to the shoe while held between the shoe and said part.

4. The method of lining brake shoes which consists of warming the lining to the state of pliability, placing the lining between the lining carrying surface of the shoe and an encircling inextensible flexible band, expanding the shoe and squeezing the lining between the shoe and the band whilst the band gives to maintain uniform radial pressure between the lining and the shoe.

5. The method of lining brake shoes which consists of warming the lining to the state of pliability, placing the lining between the lining carrying surface of the shoe and an encircling flexible band, expanding the shoe and squeezing the lining between it and the band whilst the band gives to maintain substantially uniform radial pressure between the lining and the shoe, and thereafter securing the lining to the shoe while the pressure is maintained upon the lining.

6. The method of lining brake shoes which consists in loosely positioning the lining between the surface of the shoe and a flexible inextensible encircling part and thereafter causing the shoe to exert radial outward pressure against said part to squeeze the lining between it and said part, and thereafter securing the lining to the shoe while pressure is maintained between the shoe, the lining and said part.

7. The method of lining a substantially annular brake shoe which consists in placing the lining between the shoe and a radially adjacent annular part, directing forces on the ends of the shoe which create radial pressure between the shoe and said annular part thereby squeezing the lining between the shoe and said part, and thereafter securing the lining to the shoe while pressure is maintained between the shoe and said part.

8. The method of lining a substantially annular brake shoe which consists in placing the lining between the shoe and a radially adjacent flexible inextensible encircling band, directing forces on the ends of the shoe to create radial pressure between the shoe and said band thereby squeezing the lining between the shoe and the band whilst the band and shoe flex to equalize the pressures exerted upon the lining.

9. The method of lining a substantially circular friction device with a preformed lining which is hard and relatively nonflexible at ordinary room temperatures which consists in warming the lining to a state of pliability, placing the lining between the lining supporting surface of the friction device and a radially adjacent flexible inextensible encircling band, expanding the friction device to squeeze the lining between it and said encircling band to establish an intimate uniform contact between the lining and the friction device and thereafter affixing the lining to the friction device while held between the friction device and said encircling band.

WILLIS GORDON STONER.